Figure 1:
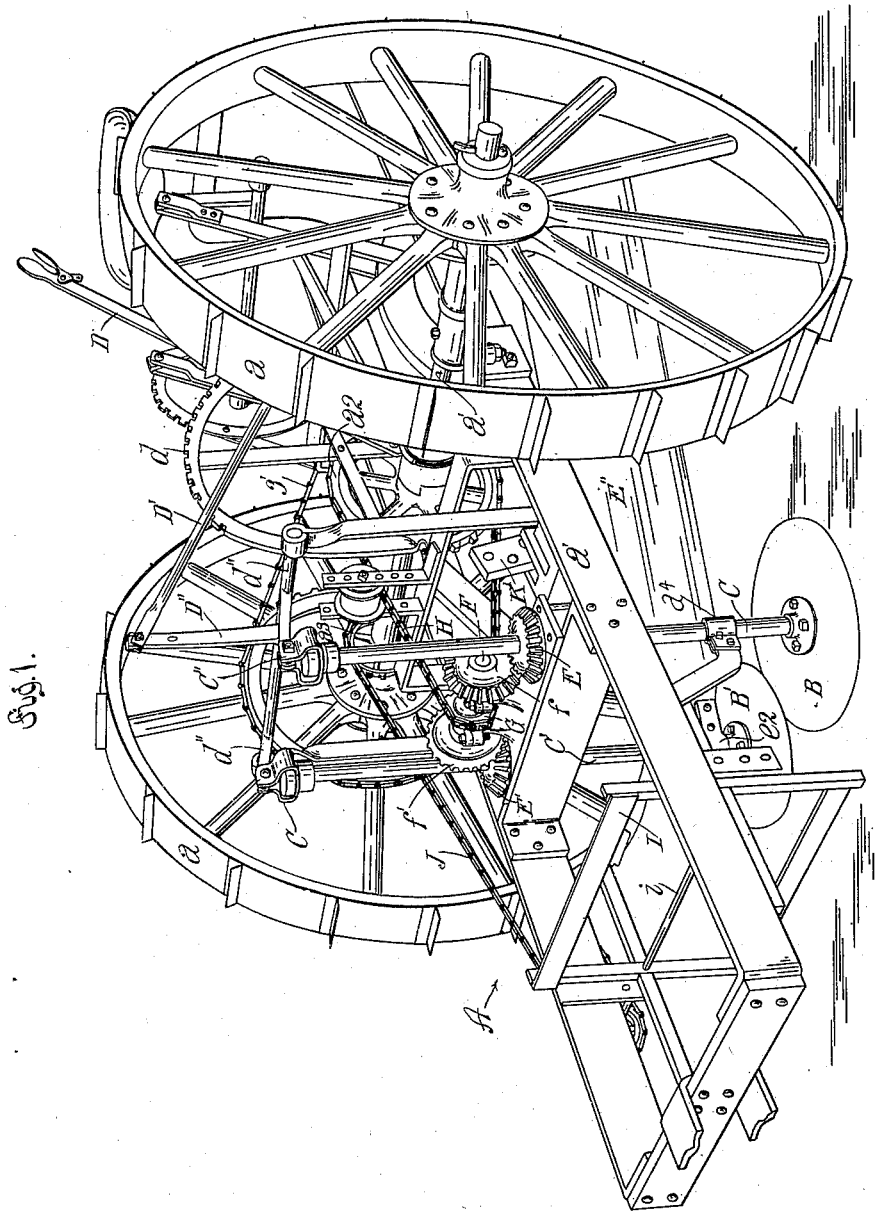

No. 647,451. Patented Apr. 10, 1900.
L. MAULHARDT & W. L. STINE.
BEET HARVESTER.
(Application filed Dec. 31, 1897.)

(No Model.) 6 Sheets—Sheet 1.

Witnesses
Perry Kingman
E. A. Hatterman

Inventors
Louis Maulhardt
William L. Stine
by Townsend Bro
Their attys.

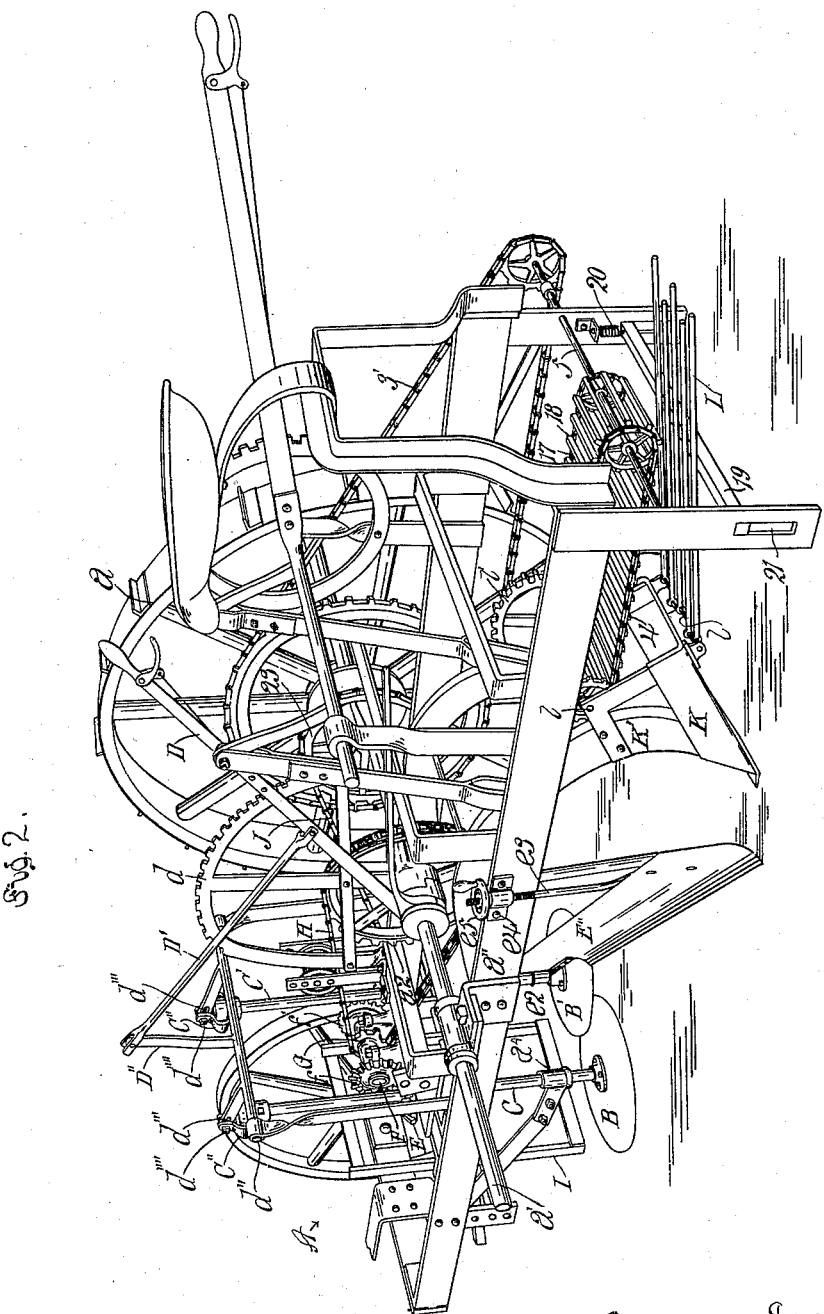

No. 647,451. Patented Apr. 10, 1900.
L. MAULHARDT & W. L. STINE.
BEET HARVESTER.
(Application filed Dec. 31, 1897.)
(No Model.) 6 Sheets—Sheet 3.
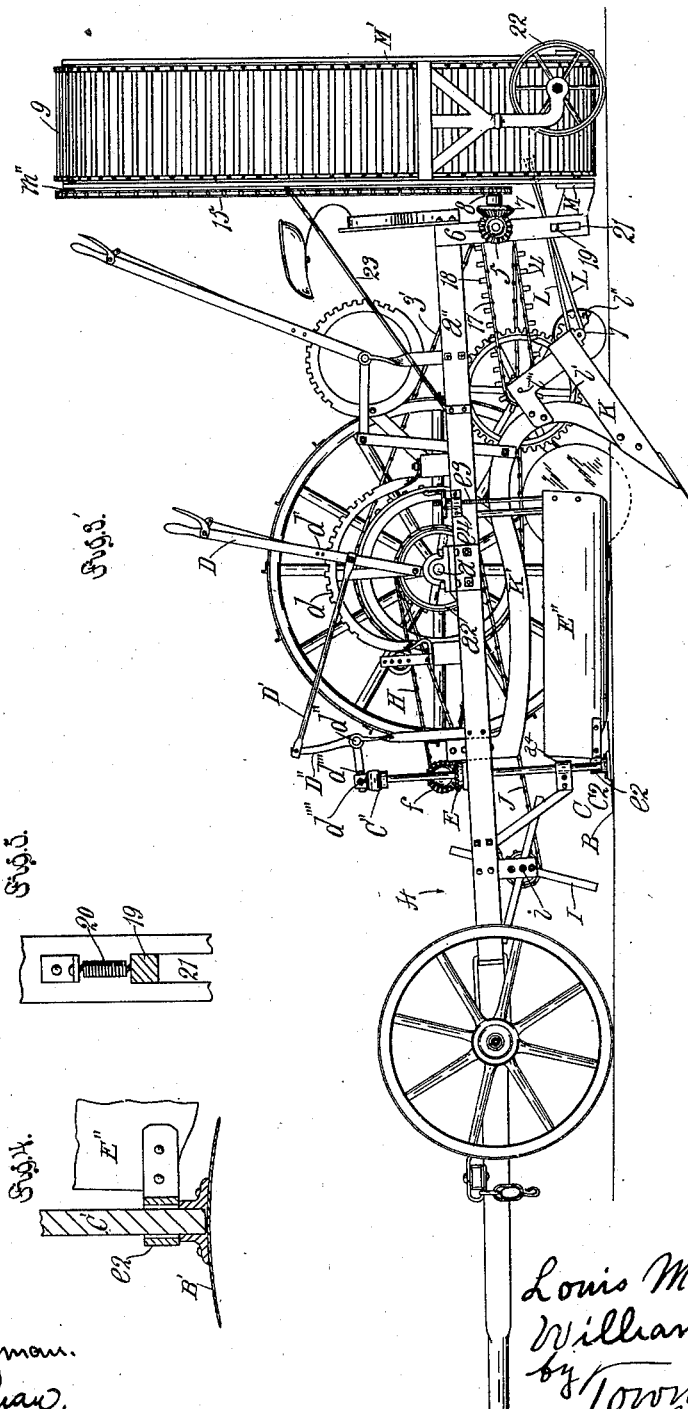

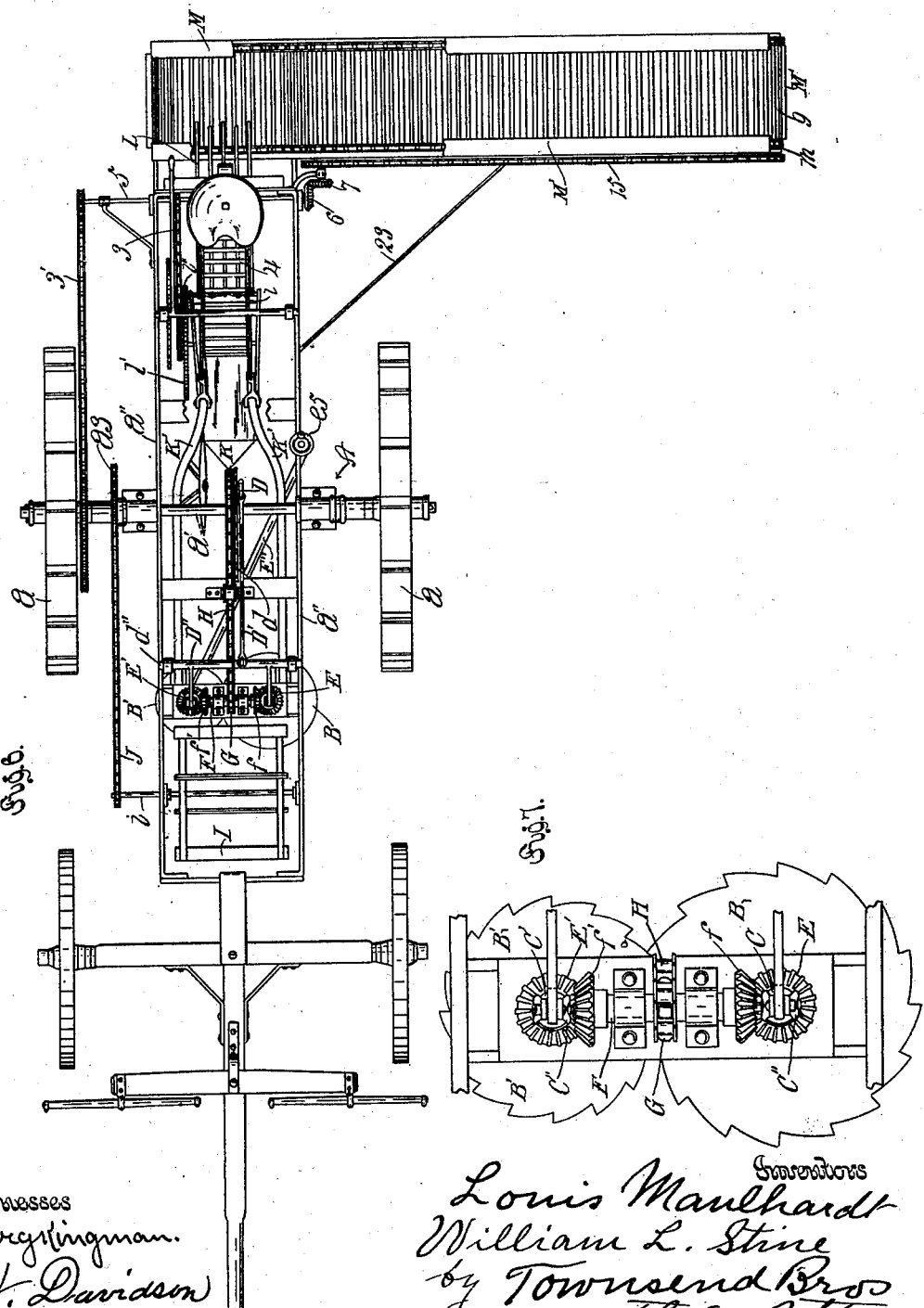

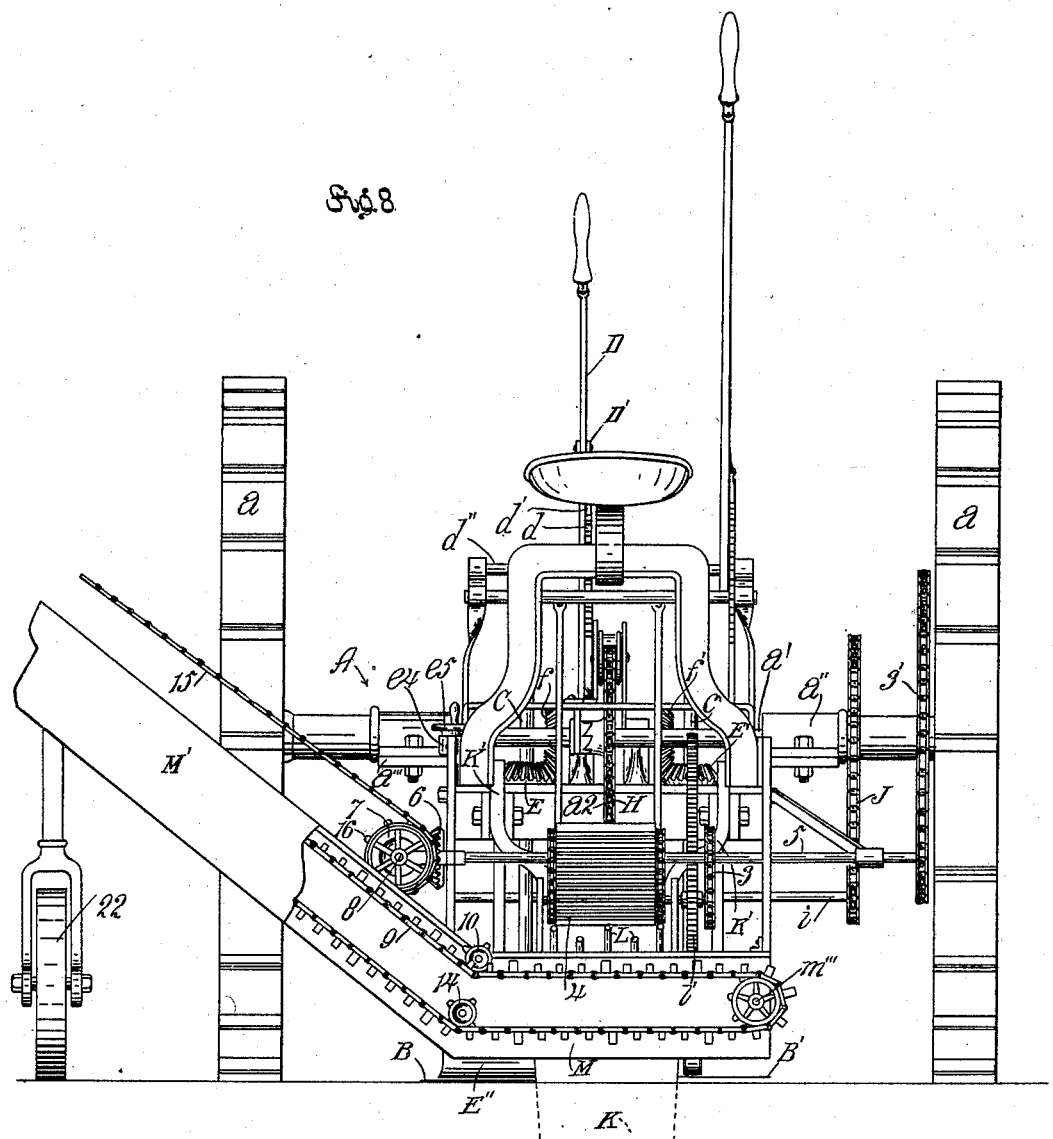

No. 647,451. Patented Apr. 10, 1900.
L. MAULHARDT & W. L. STINE.
BEET HARVESTER.
(Application filed Dec. 31, 1897.)
(No Model.) 6 Sheets—Sheet 6.
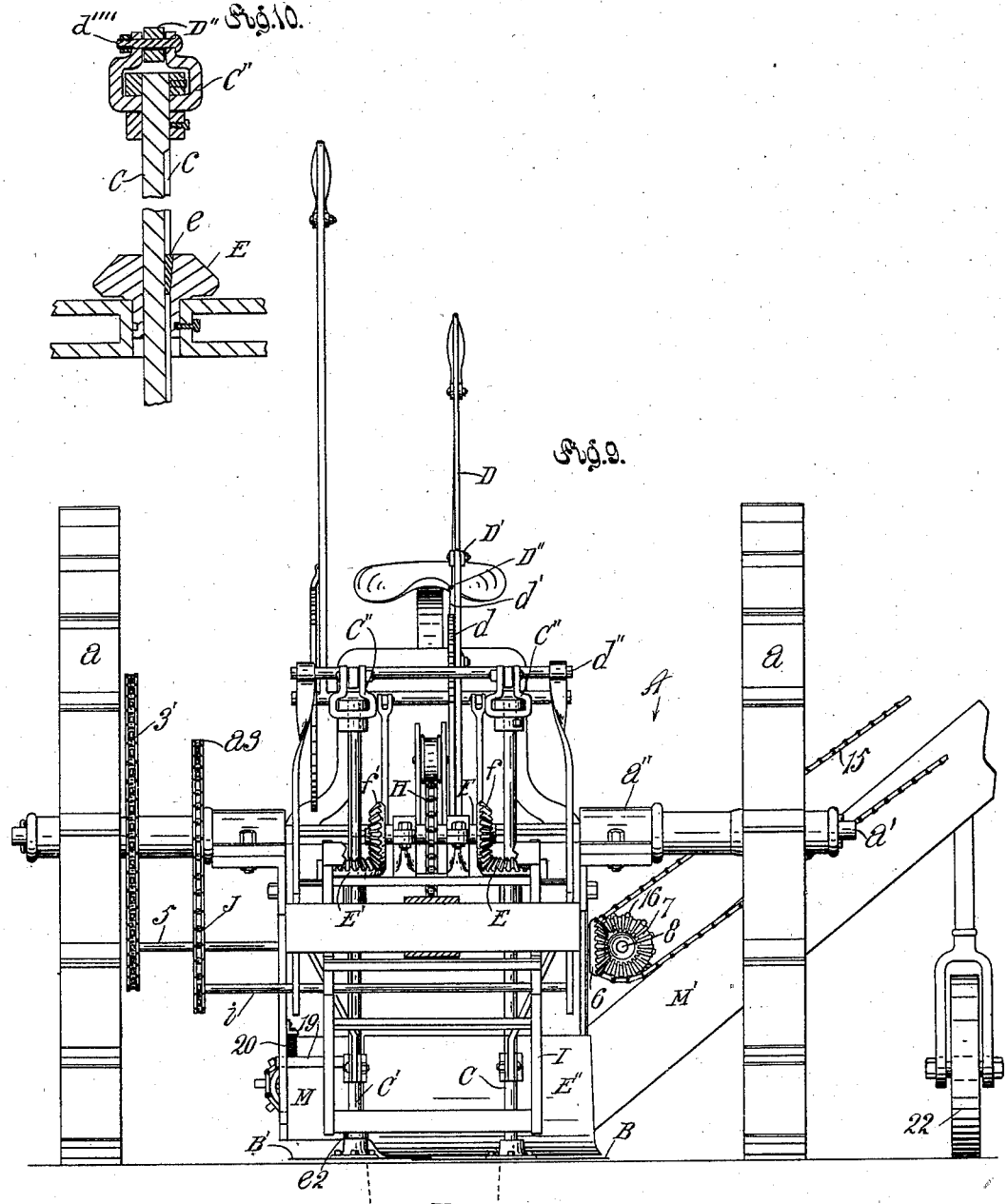

UNITED STATES PATENT OFFICE.

LOUIS MAULHARDT, OF EL RIO, AND WILLIAM L. STINE, OF SIMI, CALIFORNIA; SAID STINE ASSIGNOR OF ONE-FOURTH OF HIS RIGHT TO SAID MAULHARDT.

BEET-HARVESTER.

SPECIFICATION forming part of Letters Patent No. 647,451, dated April 10, 1900.

Application filed December 31, 1897. Serial No. 665,200. (No model.)

*To all whom it may concern:*

Be it known that we, LOUIS MAULHARDT, residing at El Rio, and WILLIAM L. STINE, residing at Simi, in the county of Ventura and State of California, citizens of the United States, have invented a new and useful Beet-Harvester, of which the following is a specification.

The object of this invention is to provide a machine which will automatically harvest crops of sugar-beets and like vegetables.

Our invention relates to a beet-harvester provided with a rotary blade, means for supporting and carrying the blade horizontally along near the surface of the ground, and means for rotating the blade. Two of these blades are preferably provided, so as to form a Y-shaped space to receive the beet-tops between the front edges of the blades. Means are provided for raising and lowering the blades to adjust them to cut the beets at the proper height. The adjustment can be made when the machine is in motion, as well as when standing still.

Our invention consists in certain improvements and combinations hereinafter fully set forth and claimed, whereby great convenience and utility are obtained.

Our invention also includes the combination of a suitable carriage, suitable cutters in front of the carriage for topping the beets, a suitable beet-digger at the rear of the cutters, a suitable elevator for lifting the beets to deposit them in a wagon, and suitable conveyer means for conveying the beets from the beet-digger to the elevator. The several operative parts are preferably connected with one or both of the ground-wheels of the carriage and driven thereby.

Our invention comprises the combination of means for cutting off the tops of the beets, means for loosening the beets in the earth and lifting them from the ground, means for receiving the beets and conveying them to an elevator, the elevator, and means for operating the same to raise the beets and deposit them in a wagon or other suitable receptacle.

It also includes other combinations and parts hereinafter set forth.

The accompanying drawings illustrate our invention.

Figure 1 is a front perspective view to show the beet topper and digger portions of the machine. Fig. 2 is a rear perspective view of the same portions of the machine, one of the wheels being removed for clearness of view. Fig. 3 is a side elevation of the entire machine embodying our invention with the share of the digger inserted in the ground. Fig. 4 is a sectional detail of the connection of the front end of the fender. Fig. 5 is a detail of the spring-sustained finger-support. Fig. 6 is a plan view of the machine shown in Fig. 3. Fig. 7 is an enlarged plan of the shafts and cutters, partly in section. Fig. 8 is a rear end elevation of the same. Fig. 9 is a front end elevation of the same. Fig. 10 is a fragmental detail showing the adjustable feature of the cutter-shaft.

A indicates a suitable carriage carrying rotary blades B B', a portion of the edges of which are superposed. Preferably one blade is larger than the other, for the reason that a large blade is more effective in cutting the large beets and it is desirable to cut as much of the beet with one blade as possible. One blade alone might be used; but that would produce a side draft, which is avoided by the use of two blades; but by preference the blades are mounted so as to form a V-space between them, the front of the V being at one side of the mid-line of the machine, so that when the machine is driven forward, with the beet-row midway between its wheels, the larger wheel will cut beyond the middle of the beet-row. The carriage is provided with two ground-wheels $a$ $a$, and the axle $a'$ fastened thereto and journaled to the frame $a''$ of the carriage, and from this axle the power is taken to drive the cutters, the beater-arms, the beet-conveyer, and the elevator.

The rotary blades B B' for topping the beets are mounted on the carriage by means of vertical shafts, so that the carriage carries the blades horizontally along near the surface of the ground.

C C' indicate two vertical rotary shafts on which the rotary blades are respectively fixed to rotate in horizontal planes. These shafts are slidably mounted in vertical bearings $a^4$ and respectively journaled thereby and by the beveled wheels E to the frame $a''$ of the carriage. Suitable means—such as the lever D D'', connecting-rod D', and rack and ratchet d d'—are provided for raising and lowering the shafts and holding them at any desired height. Any suitable means may be provided for rotating the cutters. Those shown comprise two beveled cog-wheels E E' for each shaft, respectively, said shafts being slidably mounted therein to be rotated thereby.

In Fig. 10, c indicates a keyway, and e a key in such keyway and connected with the beveled wheel E, whereby the shaft C is rotated by the beveled wheel E and at the same time is allowed to slide up and down through such wheel.

C'' is a swivel connection, one being provided between the lever D'' and each of the shafts C C', thus to allow the shafts to be raised and lowered while simultaneously rotating.

d'' is the pivot of the lever D''; d''', a slot in one of the arms thereof, in which the pivot-pin d'''' of the swivel plays.

F indicates a horizontal shaft, with beveled wheels f f' fixed thereon and meshing with the wheels E E', respectively.

G indicates a sprocket-wheel on the shaft F, the same being driven by a sprocket-chain H, which is driven by a sprocket-wheel $a^2$ on the axle a'.

The cutters being in front of the axle, the arrangement of the machinery above mentioned causes the forward movement of the carriage to rotate the cutters inward toward each other at their front peripheries. These cutters are preferably set at such distance apart as to bring the edge of one (preferably the smaller one) over the edge of the other. It is customary to make the beet-rows about eighteen inches apart, and we prefer to make the larger rotary cutter B about sixteen inches in diameter and the smaller one B' about thirteen inches, and their shafts are set equidistant from the mid-line of the machine. The result is that as the machine is moved forward, with the beet-row midway of the wheels, the cutters being brought close to the ground, the upper ends of the beets will be cut more than half-way across by the larger cutter and when fully severed by the operation of both cutters will ride out and back on the larger cutter and be dropped upon the ground at the side of the machine.

E'' indicates a fender arranged extending diagonally rearward from the cutters B' to the opposite side of the machine to throw the beet-tops out of the way of the digger.

In order to facilitate the cutting of the beet-tops, we provide in front of the cutters a rotary beater I, mounted on a shaft i and driven by a sprocket-chain J, which receives power from a sprocket-wheel $a^3$ on the axle a'.

The beet-topper may be used with and without the beater and also with and without a digger. We prefer to provide a suitable beet-digger carried by the carriage behind the rotary cutters.

K indicates a share carried by the carriage, being mounted on a beam K', pivoted to the carriage. Behind the share we provide a conveyer to clean the beets and to convey them onto an elevator, by which they will be deposited in the wagon. (Not shown.)

We will now describe the conveyer which we have invented for cleaning the beets and placing them on the elevator.

L indicates sifting-fingers which are preferably mounted on a multiple crank-shaft l, behind the beet-digger, and which shaft is arranged to rotate toward the rear to move the rear ends of the fingers, which are respectively journaled to the cranks, respectively, of the shaft l. This shaft l is driven by suitable means, such as the cog-wheel l', meshing with a cog-wheel l'' on the shaft l, the cog-wheel l' being mounted on a shaft l''', which is driven through the chains 3 and 3' by power taken from the axle a'. This arrangement causes the fingers L to operate to shake the beets and move them rearward from the share and carry them to the elevator M.

4 indicates an endless rake mounted above the fingers and mounted on and rotated by the shaft l'''.

5 is a shaft driven by sprocket-chain 3' and carries a beveled wheel 6, which meshes with a beveled wheel 7, which drives the conveyer-shaft 8.

The conveyer is made of a horizontal and an inclined member M M', carrying an endless apron 9, which is carried by the shafts m'' m''' and held in place at the bend by wheels 10 14. The top shaft m'' is provided with a sprocket-wheel and is connected by a sprocket-chain 15 with a sprocket-wheel 16 on the conveyer-shaft 8, so that the forward movement of the machine will drive the elevator to raise the beets and carry them to the side of the machine and high enough to be discharged into a wagon or other receptacle which will be driven alongside of the harvester to receive the beets.

With sugar-beets it is necessary to cut off all of the top which is exposed to the sun, and therefore the cutters will be ordinarily adjusted to cut close to the top of the earth— say not to exceed one inch above the surface. A box $e^2$ holds the front end of the fender E'', and the shaft C' is loosely journaled therein. The rear end of the fender is made vertically adjustable by means of the support-rod $e^3$, which is screw-threaded at the top and passes through a box $e^4$ and held by a crank-nut $e^5$. The endless rake 4 is composed of side chains 17 and cross-bars 18. In order to cause the endless rake to act on the large and small beets to the rear ends of the fingers, the rear ends of the fingers are supported by a yielding finger-support comprising a bar 19, held by springs 20 and playing in vertical slots 21. The bar holds the rear ends of the fingers up to hold small beets where they will be dragged along by the rake. When larger beets pass up the fingers, the bar can yield downward, so as to allow the beets to pass without being crushed between the rake and the fingers.

22 indicates a wheel for supporting the elevator, and 23 indicates a brace tying it to the frame of the machine.

In practical operation the machine will be driven forward and the ground-wheels $a$ will drive the operative parts, thus rotating the cutters in toward the mid-line of machine, and thereby causing them to readily cut off the tops of the beets as the machine advances. Preferably the gearing is such that the cutters rotate with double the speed of the advance of the machine, so that the tops of the beets are readily cut off. They fall upon the cutters and are carried back, and, falling against the fender E″, are carried to the side of the path of the machine out of the way of the digger. Then the digger-share uproots the beets and the fingers sift the beets from the earth, which falls between the fingers. The endless rake being driven by the mechanism which connects it with the axle $a'$ assists to move the beets up to the end of the sifter or conveyer finger and onto the elevator, which carries the beets to the side of the machine and lifts them into the wagon or other vehicle prepared for receiving them. When the cutter-shafts are raised or lowered, the front end of the fender is likewise raised and lowered and the boxes $e^2$ and $e^4$ are loose to allow sufficient play for this to be done.

The crack-nut at the top of the fender-supporting rod $e^3$ enables the attendant to raise and lower the rear end of the fender to adjust the lower edge to the level of the blades.

Now, having described our invention, what we claim as new, and desire to secure by Letters Patent, is—

1. The combination of a carriage with vertical shaft-bearings; two beveled cog-wheels; two vertical shafts mounted to rotate and slide in said bearings and to slide in and be rotated by said cog-wheels, respectively; two rotary blades fixed one on the end of each of said shafts to rotate therewith; means for sliding the shafts up and down in their respective bearings and cog-wheels; a horizontal shaft mounted on the carriage and provided with beveled gears respectively engaging the beveled gears of the shafts; and means for rotating the horizontal shaft.

2. The combination of a carriage with vertical shaft-bearings; a vertical shaft slidably mounted in said bearings and having fixed to its lower end a horizontal rotary blade; means for rotating the shaft slidably connected with the shaft; a swivel connected with the top of the shaft; and a lever pivoted to the carriage and connected with the swivel for raising and lowering the same.

3. The combination of the carriage having vertical bearings; a rotary shaft slidably mounted in said bearings and provided with a horizontal blade at the lower end thereof; a swivel at the upper end of the shaft; means for rotating the shaft slidably connected with the shaft; a lever pivoted to the carriage and connected with the swivel to raise and lower the same; a hand-lever pivoted to the carriage; and a connecting-rod connecting the hand-lever with the swivel-operating lever.

4. The combination of the carriage with vertical bearing; two rotary shafts mounted in vertical bearings on the carriage and provided at their lower ends with horizontal blades; two swivels, one for each of the rotary shafts; a lever pivoted to the carriage and provided with three arms, one arm being connected with one of the swivels, another arm connected with another of the swivels; a lever pivoted to the carriage; and a connecting-rod connecting said lever with the third arm of the swivel-lever; and means slidably connected with the shafts for rotating the shafts.

5. In a beet-harvester, the combination of two vertical shafts, each provided with a rotary blade, said blades being of different diameters and having a portion of their edges superposed; means for raising and lowering the shafts; and stationary means slidably connected with the shafts for rotating the shafts.

6. The combination of the carriage with ground-wheels and axle; vertical bearings on said carriage; beveled wheels mounted in line axially with said bearings; vertical shafts slidably mounted in said bearings and beveled wheels, to turn in the bearings and with the wheels, and provided with rotary cutters at the lower ends thereof, respectively; a horizontal shaft with beveled gears meshing with such beveled wheels to drive the same; means to slide the shafts up and down in the bearings and beveled wheels; and means to transmit power from the axle to the horizontal shaft.

7. The combination of the carriage with ground-wheels and axle; vertical shafts with rotary cutters at the lower ends thereof; beveled wheels respectively arranged to drive such shafts; a horizontal shaft with beveled gears meshing with such beveled wheels to drive the same; means to transmit power from the axle to the horizontal shaft; beater-arms mounted upon a rotating shaft in front of the rotary cutters; and means for communicating power from the axle to the beater-arms.

8. The combination with the carriage with ground-wheels and axle; vertical bearings on said carriage; a beveled wheel on said carriage coaxial with said bearings; a vertical shaft with rotary cutter at the lower end thereof and slidably mounted in said bearings and beveled wheel to be driven by said wheel; a horizontal shaft with beveled gear meshing with such beveled wheel to drive the same; means to transmit power from the axle to the horizontal shaft; and means to slide the vertical shaft up and down in said bearings and wheel.

9. The combination of the carriage with ground-wheels and axle; a vertical shaft with rotary cutter at the lower end thereof; a beveled wheel arranged to drive such shaft; a horizontal shaft with beveled gear meshing with such beveled wheel to drive the same; means to transmit power from the axle to the horizontal shaft; beater-arms mounted upon a rotary shaft in front of the rotary cutter; and means for communicating power from the axle to the beater-arms.

10. The combination of the carriage with ground-wheels and axle; a vertical shaft with rotary cutters at the lower end thereof; a beveled wheel arranged to drive such shaft; a horizontal shaft with beveled gear meshing with such beveled wheel to drive the same; means to transmit power from the axle to the horizontal shaft; beater-arms mounted upon a rotary shaft in front of the rotary cutter; means for communicating power from the axle to drive the shafts of the cutter and the beater-arms; a beet-digger share to lift the beets; sifting-fingers behind the axle to receive the beets; an elevator arranged transversely of the machine behind the fingers; means for conveying the beets over the fingers and onto the elevator; and means for driving the elevator.

11. The combination of the carriage with ground-wheels and axle; a vertical shaft with rotary cutters at the lower end thereof; beater-arms mounted upon a rotary shaft in front of the rotary cutter; means for communicating power from the axle to drive the shafts of the cutter and the beater-arms; a beet-digger share to lift the beets; sifting-fingers behind the axle to receive the beets; an elevator arranged transversely of the machine behind the fingers; means for conveying the beets over the fingers and onto the elevator; and means for communicating power from the axle to drive the elevator and the beet-conveyer.

12. The combination of the carriage with ground-wheels and axle; a vertical shaft with rotating cutters at the lower end thereof; beater-arms mounted upon a rotary shaft in front of the rotary cutter; means for communicating power from the axle to drive the shafts of the cutter and the beater-arms; a beet-digger share to lift the beets; an elevator at the rear of the machine; means for conveying the beets from the share to the elevator; and means for communicating power from the axle to the conveyer and elevator to drive the same.

13. In a harvester of the class described, a series of rotary cutters for topping the beets, means for actuating said cutters, and a deflector-board arranged obliquely of the machine adjacent to the cutters, whereby the centrifugal force of said cutters is adapted to deflect the tops of the beets to one side of the machine, substantially as described.

14. The combination of the carriage; the share carried by the carriage; a multiple crank-shaft at the rest of the share; a vertically-yielding finger-support behind the shaft; fingers respectively journaled at one end to the cranks respectively and the other end of said fingers carried by the finger-support; means for rotating the crank-shaft; a continuous rake above the fingers; and means for driving the rake.

15. The combination of the carriage, the vertical rotary shaft with rotating blade at the lower end; a fender connected at its front end with the shaft; and means connecting the rear of the fender with the frame.

16. The combination of the carriage, the vertical rotary shaft with rotary blade at the lower end; a fender connected at its front end with the shaft; and means adjustably connecting the rear of the fender with the frame.

LOUIS MAULHARDT.
WILLIAM L. STINE.

Witnesses:
JAMES R. TOWNSEND,
F. M. TOWNSEND.